UNITED STATES PATENT OFFICE 2,384,482

TERPENE ISOMERIZATION IN LIQUID PHASE

Robert W. Martin, Savannah, Ga., assignor to Hercules Powder Company, Wilmington, Del., a corporation of Delaware No Drawing. Application February 19, 1943, Serial No. 476,487

20 Claims. (Cl. 260—675.5)

This invention relates to improvements in terpene isomerization, and more particularly relates to the isomerization of bicyclic terpenes to a mixture of monocyclic, bicyclic, and acyclic terpenes particularly rich in dipentene, allo-ocimene, and camphene and specifically to the liquid phase isomerization of terpenes in the presence of water.

Many methods have been reported in the literature for the isomerization of terpenes using various conditions of heating and various types of catalysts. Most methods show that catalysts having an acidic reaction are necessary to the isomerization process. However, when an acid type catalyst is used poor yields of terpene isomers are obtained because of the excessive side reaction in the form of polymerization. When heat alone is used, such high temperatures are required to effect a reaction that the products of pyrolytic decomposition predominate. The use of an alkaline type catalyst permits a greater degree of selective isomerization and a greater yield of isomer because of the decreased amount of polymerization.

Now, in accordance with the present invention, it has been discovered that a bicyclic terpene may be isomerized to a desirable mixture of monocyclic, bicyclic, and acyclic terpene isomers rich in dipentene with a minimum amount of polymer by heating the terpene in the presence of water at a temperature above the boiling point of the terpene and while maintaining the mixture in a liquid phase.

A method of carrying out the process of this invention is illustrated by the following specific examples, which are not to be construed as limiting, and in which the parts expressed are by weight:

Example 1

One part of gum turpentine and one part of water were charged into a steel vessel equipped with means for agitating the mixture and for maintaining a pressure. The vessel was heated to 270° C. and held at this temperature for one-half hour. The mixture was constantly agitated during the heating period. The vessel was then cooled and the contents removed. The oil layer had a refractive index ($n_D^{20}$) of 1.4880. The density of the layer was 0.8604 at 15.6° C. Analysis of the layer indicated the presence of monocyclic terpenes particularly rich in dipentene.

Example 2

Equal parts of distilled water and commercial alpha-pinene (95% alpha-pinene) were charged into an autoclave and heat applied. When the temperature reached 180° C., the mixture was agitated and kept agitated for a period of two hours during which time the temperature was maintained at 227° C. ±2.5° C. Samples were withdrawn at intervals. The progress of the isomerization was followed by noting the change of the specific rotation of the mixture. During the two hours 35% of the pinene present when the temperature reached 227° C. was isomerized. The mixture was cooled and allowed to separate into an oil layer and a water layer. 91% of the oil layer was steam volatile. The steam-volatile portion had a refractive index ($n_D^{20}$) of 1.4753 and a specific rotation ($a_D^{20}$) of +17.45. Analysis of the oil layer indicated the presence of a mixture of monocyclic terpene monomers particularly rich in dipentene.

The following examples were carried out in substantially the same way described with reference to the above examples with changes in condition of operation as shown in the following table:

Table

| Ex. | Terpene | Parts | Catalytic agent | Parts | Reaction temp. | Reaction time | Physical characteristics of isomer recovered | | | Remarks |
|---|---|---|---|---|---|---|---|---|---|---|
| | | | | | | | $n_D^{20}$ | $a_D^{25}$ | $D_{15.5}^{15.5}$ | |
| | | | | | °C. | | | | | |
| 3 | Commercial pinene (95% α-pinene). | 1 | $H_2O$ | 1 | 250±2.5 | 2 hrs. | 1.4790 | +3.78 | | 78% of oil layer was steam volatile. Product had a bromine number of 189. |
| 4 | ...do... | 1 | $H_2O$ | 1 | 280 | 50 mins. | 1.4868 | | 0.8532 | Isomerization carried out in a continuous unit using heated coil of steel tubing. |

The product of Example 4 was further analyzed by fractional distillation. Cuts having the same boiling point were combined so that there were six fractions and a still residue as follows:

| Fraction No. | Percent of still charge | Head temperature at 30 mm. Hg pressure | $n_D^{20}$ |
|---|---|---|---|
| | | °C. | |
| 1 | 13 | 60 to 63 | 1.4682 |
| 2 | 8 | 63 to 74 | 1.4720 |
| 3 | 33 | 74 to 80 | 1.4745 |
| 4 | 10.5 | 80 to 82 | 1.4770 |
| 5 | 7 | 82 to 96 | 1.4925 |
| 6 | 10 | 96 to 102 | 1.5350 |
| Residue | 18.5 | | |
| Total | 100.0 | | |

One of the unexpected results obtained when using water in accordance with the present invention contrasted to the use of an acid, is the appearance of allo-ocimene in the products of isomerization. Also, when isomerization is carried out in the presence of water, about 10-12% of camphene appears in the product. This high percentage of camphene is entirely unexpected since it has never been found in the product obtained by the spontaneous or by the acid catalytic isomerization of alpha-pinene in either the liquid or vapor phases. Spontaneous isomerization concerns isomerization without the assistance of a catalyst.

Bicyclic terpenes and particularly alpha-pinene may be isomerized to a desirable mixture of monocyclic, bicyclic, and acyclic terpenes particularly rich in dipentene, by heating in liquid phase above the boiling point of the terpene and in the presence of water.

The terpenes capable of being isomerized under the conditions of this invention are the bicyclic terpenes as, for example, alpha-pinene and beta-pinene. Bicyclic terpene-containing materials as, for example, the oleoresins obtainable from the pine tree, and the more volatile components of the oleoresins as, for example, the material known as turpentine may be used. Gum and wood turpentine are particularly desirable for purposes of isomerization to monocyclic terpenes rich in dipentene because of the presence of a large amount of alpha-pinene.

Operable conditions of heating in accordance with the present invention are those temperatures which are above the boiling point of the terpene being isomerized and below its critical temperature. Under normal conditions of operation, the upper temperature limit will be about 300° C. It is preferred to carry out the heating within a temperature range between about 225° C. and about 275° C. and a substantially optimum condition of temperature is 250° C.±2.5° C.

The catalytic agent operable in accordance with this invention is water. The proportion of terpene to water may be varied within wide limits. It is preferred to use from about 10 parts of terpene to about 1 part of water to about equal parts of terpene and water.

The isomerization of the terpenes is carried out while maintaining the terpene component and the water component of the mixture of terpene and water in the liquid phase or in a liquid condition by the suitable means of pressure. Pressures as high as 1200 to 1400 pounds per square inch may be used when heating the terpene at 275° C. in order to keep the system in the liquid phase. Intimate contact between the components of the mixture may be obtained by any suitable means as, for example, a stirring mechanism or agitator. It is desirable to maintain the mixture under constant agitation during the heating operation.

The process may be carried out continuously by passing the mixture of alpha-pinene or other terpenes capable of being isomerized under the conditions of this invention together with water through suitable tubes or other chambers maintained at a temperature above the boiling point of the terpene being isomerized and at a pressure sufficient to maintain the components of the mixture in a liquid state.

In accordance with the process of the present invention bicyclic terpenes may be isomerized by heating the terpene at a temperature above its boiling point in the presence of water while maintaining the components of the system in a liquid condition. The monocyclic terpene isomers resulting from the heat treatment in the presence of water may be selectively hydrogenated to carvo-menthene in substantially quantitative yields at pressures of from 1 to 3 atmospheres and temperatures below about 50° C.

What I claim and desire to protect by Letters Patent is:

1. The process of isomerizing a bicyclic terpene containing material which comprises heating the material above its boiling in liquid phase in the presence of effective amounts of water as the sole catalyst.

2. The process of isomerizing a bicyclic terpene containing material which comprises heating said material at a temperature between about its boiling point and about 300° C. in liquid phase in the presence of effective amounts of water as the sole catalyst.

3. The process of isomerizing a bicyclic terpene containing material which comprises heating said material at a temperature between about 225° C. and about 275° C. in liquid phase in the presence of effective amounts of water as the sole catalyst.

4. The process of isomerizing a bicyclic terpene-containing material which comprises heating said material at a temperature between about 225° C. and about 275° C. in liquid phase in the presence of water as the sole catalyst in an amount by weight ranging from about 1 to about 0.1 times the amount by weight of said material.

5. The process of isomerizing a bicyclic terpene which comprises heating the terpene above its boiling point in liquid phase in the presence of effective amounts of water as the sole catalyst.

6. The process of isomerizing a pinene which comprises heating the pinene above its boiling point in liquid phase in the presence of effective amounts of water as the sole catalyst.

7. The process of isomerizing turpentine which comprises heating the turpentine above its boiling point in liquid phase in the presence of effective amounts of water as the sole catalyst.

8. The process of isomerizing alpha-pinene which comprises heating the pinene above its boiling point in liquid phase in the presence of effective amounts of water as the sole catalyst.

9. The process of isomerizing beta-pinene which comprises heating the pinene above its boiling point in liquid phase in the presence of effective amounts of water as the sole catalyst.

10. The process of isomerizing turpentine which comprises heating the turpentine at a temperature between about its boiling point and about 300° C. in liquid phase in the presence of effective amounts of water as the sole catalyst.

11. The process of isomerizing alpha-pinene which comprises heating the pinene at a temperature between about its boiling point and about 300° C. in liquid phase in the presence of effective amounts of water as the sole catalyst.

12. The process of isomerizing beta-pinene which comprises heating the pinene at a temperature between about its boiling point and about 300° C. in liquid phase in the presence of effective amounts of water as the sole catalyst.

13. The process of isomerizing turpentine which comprises heating the turpentine at a temperature between about 225° C. and about 275° C. in liquid phase in the presence of effective amounts of water as the sole catalyst.

14. The process of isomerizing alpha-pinene which comprises heating the pinene at a temperature between about 225° C. and about 275° C. in liquid phase in the presence of effective amounts of water as the sole catalyst.

15. The process of isomerizing alpha-pinene which comprises heating the pinene at a temperature of about 250° C. in liquid phase in the presence of effective amounts of water as the sole catalyst.

16. The process of isomerizing beta-pinene which comprises heating the pinene at a temperature between about 225° C. and about 275° C. in liquid phase in the presence of effective amounts of water as the sole catalyst.

17. The process of isomerizing beta-pinene which comprises heating the pinene at a temperature of about 250° C. in liquid phase in the presence of effective amounts of water as the sole catalyst.

18. The process of isomerizing turpentine which comprises heating the turpentine at a temperature of between about 225° C. and about 275° C. in liquid phase in the presence of water as the sole catalyst in an amount by weight ranging from about 1 to about 0.1 times the amount by weight of turpentine.

19. The process of isomerizing alpha-pinene which comprises heating the pinene at a temperature between about 225° C. and about 275° C. in liquid phase in the presence of water as the sole catalyst in an amount by weight ranging from about 1 to about 0.1 times the amount by weight of pinene.

20. The process of isomerizing beta-pinene which comprises heating the pinene at a temperature between about 225° C. and about 275° C. in liquid phase in the presence of water as the sole catalyst in an amount by weight ranging from about 1 to about 0.1 times the amount by weight of terpene.

ROBERT W. MARTIN.

CERTIFICATE OF CORRECTION.

Patent No. 2,384,482.   September 11, 1945.

ROBERT W. MARTIN.

It is hereby certified that error appears in the printed specification of the above numbered patent requiring correction as follows: Page 2, second column, line 28, claim 1, after "boiling" insert --point--; and that the said Letters Patent should be read with this correction therein that the same may conform to the record of the case in the Patent Office.

Signed and sealed this 4th day of December, A. D. 1945.

Leslie Frazer (Seal)   First Assistant Commissioner of Patents.

11. The process of isomerizing alpha-pinene which comprises heating the pinene at a temperature between about its boiling point and about 300° C. in liquid phase in the presence of effective amounts of water as the sole catalyst.

12. The process of isomerizing beta-pinene which comprises heating the pinene at a temperature between about its boiling point and about 300° C. in liquid phase in the presence of effective amounts of water as the sole catalyst.

13. The process of isomerizing turpentine which comprises heating the turpentine at a temperature between about 225° C. and about 275° C. in liquid phase in the presence of effective amounts of water as the sole catalyst.

14. The process of isomerizing alpha-pinene which comprises heating the pinene at a temperature between about 225° C. and about 275° C. in liquid phase in the presence of effective amounts of water as the sole catalyst.

15. The process of isomerizing alpha-pinene which comprises heating the pinene at a temperature of about 250° C. in liquid phase in the presence of effective amounts of water as the sole catalyst.

16. The process of isomerizing beta-pinene which comprises heating the pinene at a temperature between about 225° C. and about 275° C. in liquid phase in the presence of effective amounts of water as the sole catalyst.

17. The process of isomerizing beta-pinene which comprises heating the pinene at a temperature of about 250° C. in liquid phase in the presence of effective amounts of water as the sole catalyst.

18. The process of isomerizing turpentine which comprises heating the turpentine at a temperature of between about 225° C. and about 275° C. in liquid phase in the presence of water as the sole catalyst in an amount by weight ranging from about 1 to about 0.1 times the amount by weight of turpentine.

19. The process of isomerizing alpha-pinene which comprises heating the pinene at a temperature between about 225° C. and about 275° C. in liquid phase in the presence of water as the sole catalyst in an amount by weight ranging from about 1 to about 0.1 times the amount by weight of pinene.

20. The process of isomerizing beta-pinene which comprises heating the pinene at a temperature between about 225° C. and about 275° C. in liquid phase in the presence of water as the sole catalyst in an amount by weight ranging from about 1 to about 0.1 times the amount by weight of terpene.

ROBERT W. MARTIN.

CERTIFICATE OF CORRECTION.

Patent No. 2,384,482.　　　　　　　　　　　　　September 11, 1945.

ROBERT W. MARTIN.

It is hereby certified that error appears in the printed specification of the above numbered patent requiring correction as follows: Page 2, second column, line 28, claim 1, after "boiling" insert --point--; and that the said Letters Patent should be read with this correction therein that the same may conform to the record of the case in the Patent Office.

Signed and sealed this 4th day of December, A. D. 1945.

Leslie Frazer (Seal)　　　　　　　　　　　　First Assistant Commissioner of Patents.